UNITED STATES PATENT OFFICE.

JOSEPH WILSON SWAN, OF NEWCASTLE-UPON-TYNE, COUNTY OF NORTHUMBERLAND, ENGLAND.

SECONDARY VOLTAIC CELLS.

SPECIFICATION forming part of Letters Patent No. 256,070, dated April 4, 1882.

Application filed January 18, 1882. (No specimens.) Patented in England December 15, 1881.

*To all whom it may concern:*

Be it known that I, JOSEPH WILSON SWAN, a subject of the Queen of Great Britain, and residing at Newcastle-upon-Tyne, in the county of Northumberland, England, have invented certain Improvements in Secondary Voltaic Cells, (for which I have obtained a patent in Great Britain, No. 5,494, dated 15th December, 1881,) of which the following is a specification.

My invention has for its object the preparation of lead plates to be used in the construction of cells for secondary batteries, upon the principle proposed by Planté, with a view to diminish the time usually occupied in their preparation.

In carrying out my invention I take plates of lead of any suitable form, but preferably corrugated grooved cellular or perforated plates, as described in the specification of my application of even date herewith, and I expose them to the combined action of acetic acid, carbonic acid, and atmospheric air, as in the well-known process of making white lead, which action results in the formation of carbonate of lead on the lead plates. This formation may extend to a depth greater or less, according to the time such plates are subjected to the action of the vapors and gases. After this action has taken place to a sufficient depth, a portion of the plate being generally allowed to remain unacted upon, I subject the treated plates to the action of electrolytic hydrogen by making them the cathode of an electric generator, which may either be a voltaic battery, a dynamo or magneto electric machine, or thermo-pile, or any other suitable electricity-generator in a suitable electrolyte. When the carbonate of lead has been transformed into metallic lead by the said electrolytic action I arrange and use the plates so treated in the well-known manner of arranging and using lead plates in the construction and charging and use of Planté's secondary cells.

In carrying out my invention I do not limit myself to the use of the corrugated grooved cellular or perforated plates above referred to, but may use lead plates with a plain surface. In treating such lead plates I may protect portions of the surface from the action of the acid vapors by the application of paint, varnish, or other suitable resisting medium, painted, printed on, or otherwise applied in such a form or design as to in effect leave the acted-upon portions of the plate framed or walled in in sections by the unacted portions of the plate.

The result of the exposure of the lead plates to the carbonating process and the subsequent induction to a metallic form of the crust of carbonate of lead is the production of an open and porous form of lead peculiarly adapted for the storage of a large amount of electro-chemical energy.

I claim as my invention—

The method of preparing lead plates for use in secondary voltaic cells by subjecting the same to the combined action of acetic acid and atmospheric air, and subsequently reducing the carbonate of lead formed to metallic lead, substantially as described.

In testimony whereof I have signed my name to this specification in the presence of two subscribing witnesses.

JOSEPH WILSON SWAN.

Witnesses:
 CHAS. MILLS,
 JOHN JAMES,
*Both of 47 Lincoln's Inn Fields, London.*

It is hereby certified that in Letters Patent No. 256,070, granted April 4, 1882, to Joseph Wilson Swan of Newcastle-upon-Tyne, County of Northumberland, England, for an improvement in "Secondary Voltaic Cells," the words "carbonic acid" were inadvertently omitted after the words "acetic acid," in line 66 of the printed specification attached to and forming a part of said Letters Patent; that the proper corrections have been made in the files and records pertaining to the case in the Patent Office, and are hereby made in said Letters Patent to conform to the original papers filed in the case.

Signed, Countersigned and sealed this 18th day of April, A. D. 1882.

[SEAL.]

A. BELL,
                                      *Acting Secretary of the Interior.*

Countersigned:

E. M. MARBLE,
      *Commissioner of Patents.*